(12) United States Patent
Aibara

(10) Patent No.: US 8,810,449 B2
(45) Date of Patent: Aug. 19, 2014

(54) SATELLITE RADIO RECEIVER

(75) Inventor: Takehiro Aibara, Tokyo (JP)

(73) Assignee: Casio Computer Co., Ltd, Tokyo (JP)

( * ) Notice: Subject to any disclaimer, the term of this patent is extended or adjusted under 35 U.S.C. 154(b) by 354 days.

(21) Appl. No.: 13/405,484

(22) Filed: Feb. 27, 2012

(65) Prior Publication Data

US 2012/0218148 A1 Aug. 30, 2012

(30) Foreign Application Priority Data

Feb. 28, 2011 (JP) ................................. 2011-041165

(51) Int. Cl.
*G01S 19/29* (2010.01)

(52) U.S. Cl.
USPC .................................................... 342/357.69

(58) Field of Classification Search
USPC .................................................... 342/357.69
See application file for complete search history.

(56) References Cited

U.S. PATENT DOCUMENTS

2002/0004392 A1 1/2002 Farine et al.

FOREIGN PATENT DOCUMENTS

| JP | 2001-159670 | 6/2001 |
|----|-------------|--------|
| JP | 2002-122655 | 4/2002 |
| JP | 2006-254500 | 9/2006 |
| JP | 2006-261985 | 9/2006 |
| JP | 2007-333593 | 12/2007 |

OTHER PUBLICATIONS

Japanese Office Action for Japanese Application No. 2011-041165 mailed on Jan. 8, 2013.
Japanese Office Action for Japanese Patent Application No. 2011-041165 mailed Dec. 3, 2013.

*Primary Examiner* — Harry Liu
(74) *Attorney, Agent, or Firm* — Amin, Turocy & Watson, LLP

(57) ABSTRACT

A satellite radio receiver includes: an acquisition unit for setting one reception frequency in turn at a first frequency interval over a first frequency range, allowing a processor to acquire a signal having the reception frequency as digital data having a first bit number, and detecting the satellite signals based on a result of predetermined processes with the digital data; and a specifying unit for, in response to detection of satellite signals by the acquisition unit, concurrently setting predetermined number of reception frequencies in turn at a second frequency interval narrower than the first frequency interval, allowing the processor to acquire the respective signals having the reception frequencies as digital data having a second bit number smaller than the first bit number, and specifying reception frequencies of the satellite signals based on the result of the predetermined processes concurrently executed with the predetermined number of digital data.

20 Claims, 7 Drawing Sheets

| ch | -150 | -145 | -140 | -135 | -130 | -125 | | 145 | 150 |
|---|---|---|---|---|---|---|---|---|---|
| n | | | | | | | | | |
| S/N | | | | | | | | | |

US 8,810,449 B2

SATELLITE RADIO RECEIVER

BACKGROUND OF THE INVENTION

1. Field of the Invention

The present invention relates to a satellite radio receiver that receives radio waves from positioning satellites to acquire satellite signals.

2. Description of Related Art

Some conventional portable devices such as electronic watches include receivers, which receive radio waves transmitted from positioning satellites belonging to the Global Navigation Satellite System (GNSS) including the Global Positioning System (GPS), to acquire time information and positional information. Such portable devices can correct the time to be displayed or can set a time zone based on the acquired time information and positional information.

The satellite signals output from the positioning satellites are transmitted as radio waves while being spread-modulated with unique spreading codes (pseudo-noise) set for each of the positioning satellites. Upon receiving the radio waves, the satellite signals from the positioning satellites can be decoded through inverse spreading using a spreading code set for each of the positioning satellites. A receiver that has no preliminary information on visibility or signal-receiving availability of the positioning satellites, which move on predetermined orbits, performs acquisition involving detection of satellite signals through inverse spreading on the received radio signals in a round robin fashion with spreading codes of all the positioning satellites so that an available positioning satellite is identified.

A matched filter (sliding correlator) has been used for such acquisition, and high-speed acquisition is achieved through concurrent inverse spreading with spreading codes of a plurality of satellites. Furthermore, Japanese Unexamined Patent Application Publication No. 2001-159670 discloses a technique that concurrently reads/writes data of concurrent inverse spreading from/to a plurality of memories to prevent a delay in I/O processing against data processing.

Japanese Unexamined Patent Application Publication No. 2002-122655 (corresponding to US 2002/0004392 A1) discloses a technique to set power and a clock signal to be supplied to a correlator for data acquisition and a microprocessor for computing the position or time based on acquired data to a required period and a required frequency, for the purpose of a reduction in power consumption.

The radio waves transmitted from the positioning satellite are received at a frequency different from the transmission frequency due to Doppler effect caused by the positioning satellite moving around the earth at high speed. Hence, in the case where the radio waves from the positioning satellite are received by a receiver having no current position data and no orbital data of the positioning satellites in advance, the receiver must search for a reception frequency of the radio waves from the positioning satellite within a possible variable frequency range due to the Doppler effect. This results in an increase in acquisition time in proportion to the number of reception frequency steps.

For example, in the matched filter, a storage unit for storing received data accounts for a large proportion of size compared with other components used for data acquisition in an acquisition circuit. Hence, if a plurality of storage units is provided for concurrently processing received data at various reception frequencies to achieve high-speed acquisition, the scale of the circuit for acquisition inconveniently increases.

SUMMARY OF THE INVENTION

The present invention is a satellite radio receiver that can receive radio waves at a reduced time from positioning satellites without an increase in a circuit scale.

An embodiment of the present invention is a satellite radio receiver for acquiring satellite signals transmitted from positioning satellites via radio waves, the satellite radio receiver includes: a receiver for receiving the radio waves in a frequency band containing transmission frequencies of the satellite signals; a detection processor for concurrently performing predetermined processes for detecting the satellite signals from received radio signals in the radio waves received by the receiver to a predetermined number of two or more reception frequencies; an acquisition unit for (i) setting one reception frequency in turn at a first frequency interval over a first frequency range, (ii) allowing the detection processor to acquire a signal having the reception frequency as digital data having a first bit number, and (iii) detecting the satellite signals based on a result of the predetermined processes with the digital data; and a specifying unit for, in response to detection of the satellite signals by the acquisition unit, (i) concurrently setting the predetermined number of reception frequencies in turn at a second frequency interval narrower than the first frequency interval, (ii) allowing the detection processor to acquire the respective signals having the reception frequencies as digital data having a second bit number smaller than the first bit number, and (iii) specifying reception frequencies of the satellite signals based on the result of the predetermined processes that are concurrently executed with the predetermined number of digital data.

DESCRIPTION OF THE PREFERRED EMBODIMENTS

Hereinafter, a satellite radio receiver according to an embodiment of the present invention is described with reference to the accompanying drawings.

Figure 1:
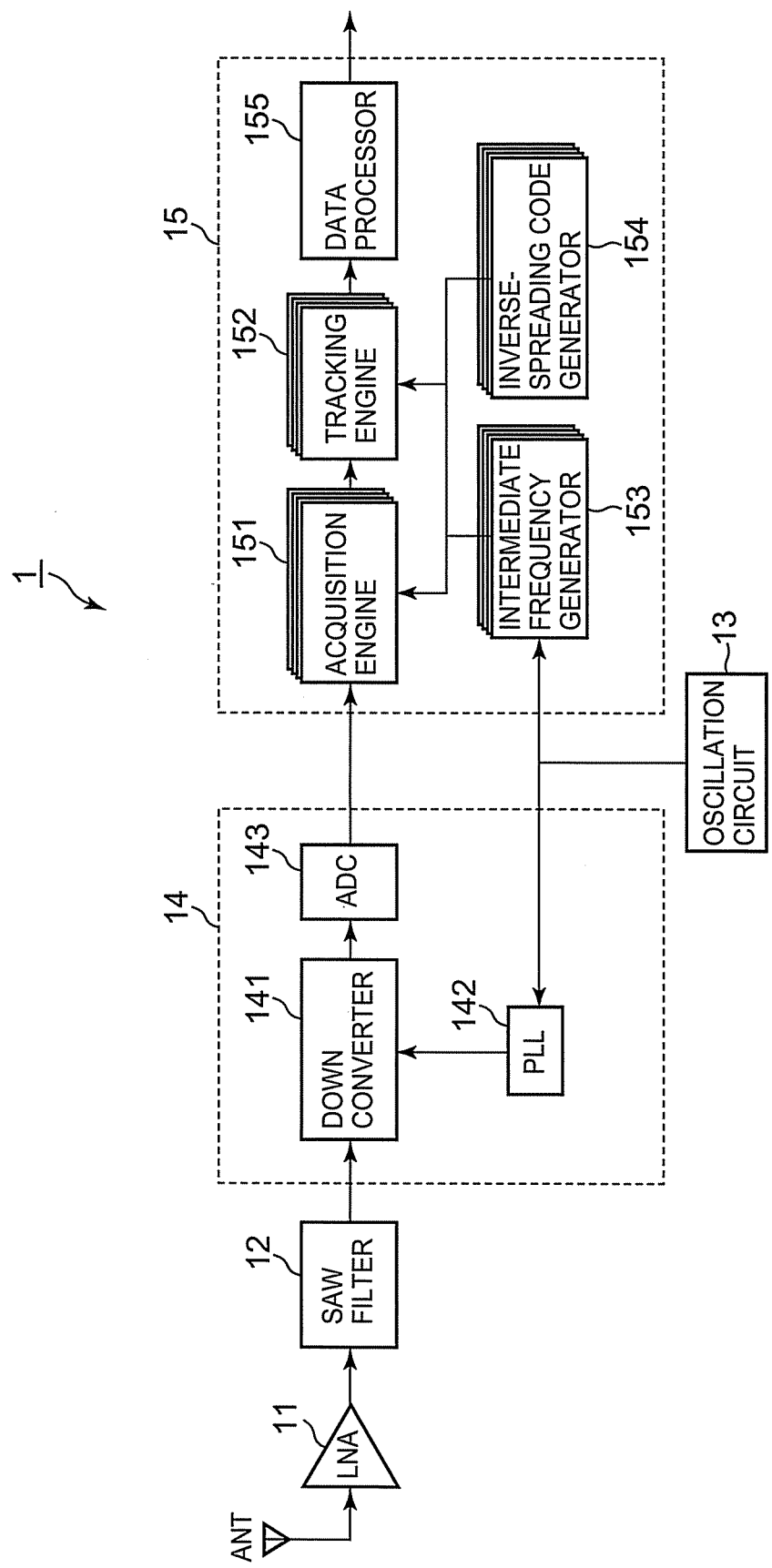
FIG. 1 is a block diagram illustrating a configuration of a satellite radio receiver and a signal flow therein according to an embodiment of the present invention.

FIG. 1 is a block diagram illustrating a configuration of the satellite radio receiver and a signal flow therein according to the embodiment.

The satellite radio receiver 1 is mounted in, for example, a portable watch, and outputs time information based on radio waves received from GPS satellites. The satellite radio receiver 1 includes a receiving antenna ANT, a low noise amplifier (LNA) 11, a narrow band filter 12, an oscillation circuit 13, an RF unit 14, and a baseband unit 15.

The receiving antenna ANT can receive radio waves in the L1 band (1.57542 GHz) transmitted from the GPS satellites. The narrow band filter 12 is, for example, a surface acoustic wave (SAW) filter, and has a bandwidth of approximately 1 to 10 MHz. Such a bandwidth is significantly large compared to a difference between the transmission frequency from the GPS satellites and the reception frequency in the satellite radio receiver 1 due to Doppler effect or errors of a measuring instrument in the satellite radio receiver 1.

The oscillation circuit 13 typically includes a crystal oscillator (TCXO) having a temperature compensating circuit, for example. The oscillation circuit 13 generates a signal having a reference frequency of 16.368 MHz, for example.

The RF unit 14 converts a received signal having a carrier frequency (received radio signal) based on the received radio waves to a signal in an intermediate frequency band, and outputs the signal as digital data. The RF unit 14 includes a down converter 141, a phase locked loop (PLL) 142, and an analog-to-digital converter (ADC) 143.

The down converter 141 is a circuit that converts the received radio signal to the intermediate-frequency signal, and includes, for example, a mixer and a narrow band filter. The intermediate frequency IF0 is approximately 4 MHz, for example.

The PLL 142 is a circuit that sends signals having a predetermined local frequency to the mixer of the down converter 141 in synchronization with the signals output from the oscillation circuit 13, and includes, for example, a voltage controlled oscillator (VCO), a prescaler, and a phase comparator. The VCO generates signals having a frequency determined by an input DC voltage, and outputs the signals to the mixer of the down converter 141. The prescaler divides the frequency of the signals output from the VCO and outputs the frequency-divided signals to the phase comparator. The phase comparator compares the phase of the frequency-divided signals output from the VCO with the phase of the signal output from the oscillation circuit, and modifies the DC voltage to be output to the VCO depending on a difference between the phases. The local frequency is controlled in such a configuration, so that signals having a certain frequency can be stably output to the down converter 141.

The ADC 143 converts the received radio signals, which have been converted to the intermediate frequency signals and output from the down converter 141, to digital values at a predetermined sampling frequency and outputs the digital values to the baseband unit 15. Each digital value output from the ADC 143 is, but not limited to, 12-bit data, for example. The receiving antenna ANT, the low noise amplifier 11, the narrow band filter 12, and the RF unit 14 constitute a reception unit.

The baseband unit 15 includes an acquisition engine 151, a tracking engine 152, an intermediate frequency generator 153 (a local frequency oscillator), an inverse-spreading code generator 154, and a data processor 155. In addition, the baseband unit 15 includes a controller 156 (an acquisition unit, or a specifying unit) including a central processing unit (CPU) for controlling the operation of the baseband unit 15, and a memory 157 (unit for storing the results of processing) such as a random access memory (RAM) for temporarily storing data (see FIG. 2).

The acquisition engine 151 is a circuit that processes data for detecting satellite signals from the digital signals received from the RF unit 14, and specifying the reception frequency and the satellite identification number of the satellite signals, as described in detail below.

The tracking engine 152 detects a phase synchronization point between the satellite signals received based on the reception frequency and the satellite identification number specified through the data processing by the acquisition engine 151 and an internal clock of the satellite radio receiver 1, and continuously outputs the satellite signals that are demodulated while such phase synchronization is being maintained.

The intermediate frequency generator 153 generates intermediate-frequency local signals and outputs the signals to the acquisition engine 151 or the tracking engine 152. The intermediate frequency generator 153 in the baseband unit 15 of the satellite radio receiver 1 of the embodiment consists of two numerically-controlled oscillators (NCO) 153a and 153b (see FIG. 2). In the NCOs 153a and 153b, the frequency of the generated intermediate-frequency local signals is individually and precisely controlled based on a setting value input to each NCO. Each of the NCOs 153a and 153b can output in-phase (I-phase) local signals and quadrature-phase (Q-phase) local signals orthogonal to the I-phase local signals.

The inverse-spreading code generator 154 generates spreading codes and outputs the codes to the acquisition engine 151 or the tracking engine 152. After a satellite identification number is specified, the inverse-spreading code generator 154 of the satellite radio receiver 1 of the embodiment generates a C/A code that is used as a spreading code in the positioning satellite corresponding to the satellite identification number. The C/A code includes an array of 1023 binary codes (chips) transmitted within a cycle of 1 ms.

The acquisition engine 151 and the inverse-spreading code generator 154 constitute a detection processor.

The data processor 155 decodes the satellite signals, which are demodulated and output by the tracking engine 152, to acquire time data. In addition, the data processor 155 calculates the position of the GPS satellite and the current position of the satellite radio receiver 1 as necessary, and outputs such acquired data or calculated data in a predetermined format.

An internal configuration of the acquisition engine 151 now be described.

Figure 2:
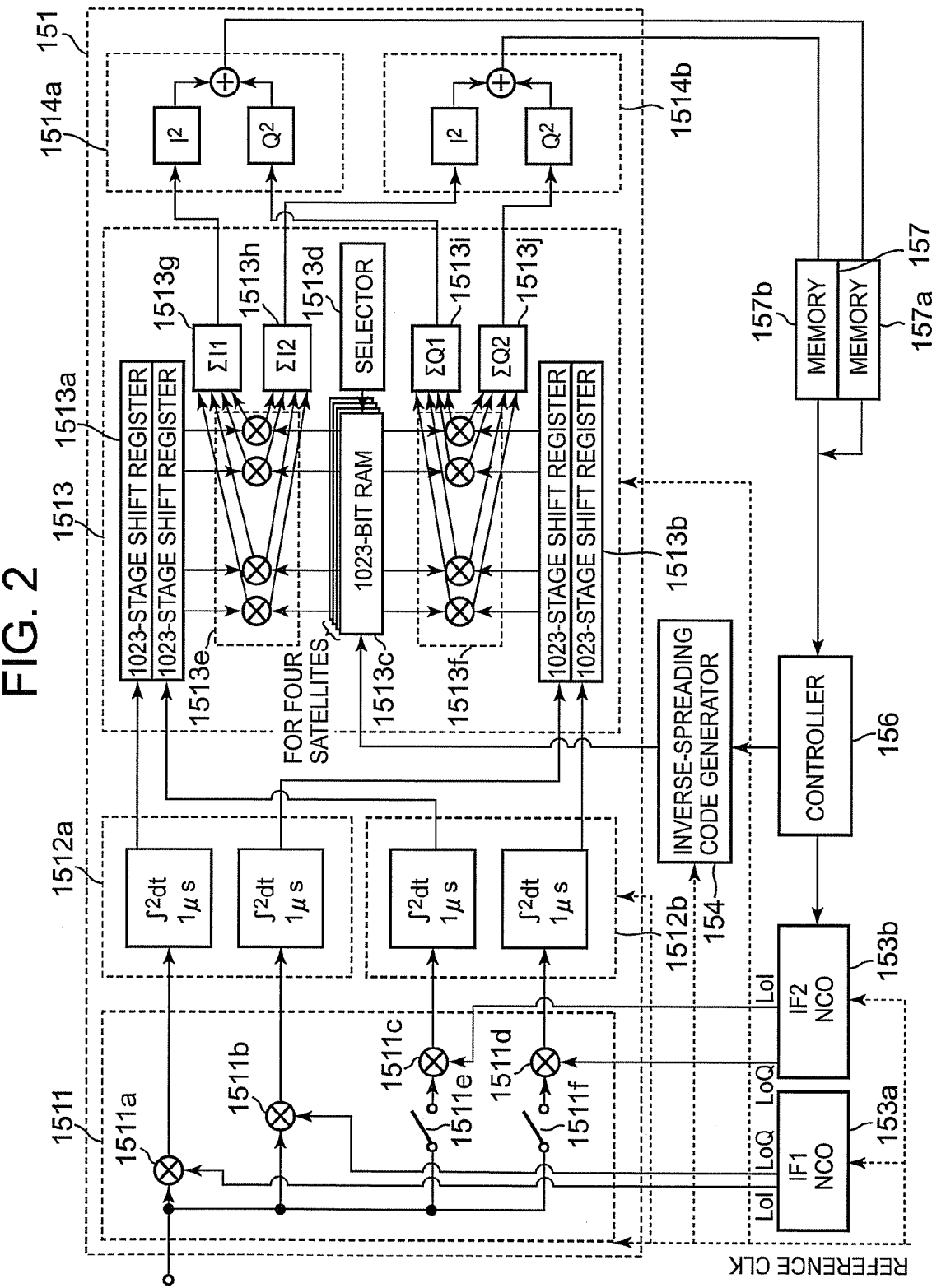
FIG. 2 illustrates a configuration of an acquisition engine and relevant components.

FIG. 2 illustrates a configuration of the acquisition engine 151 and relevant components.

The acquisition engine 151 includes an I/Q converter 1511, two integrators 1512a and 1512b, a correlator 1513, and two squaring circuits 1514a and 1514b.

The I/Q converter 1511 separates intermediate-frequency digital signals generated by conversion of received radio signals in the RF unit 14 into orthogonal two-components baseband signals and output the baseband signals. The I/Q converter 1511 includes four mixers 1511a to 1511d and two switches 1511e and 1511f. The switches 1511e and 1511f are synchronously switched on or off under controlled timing in response to a control signal sent from the controller 156. During an "on" period of the switches 1511e and 1511f, the intermediate-frequency digital signals are separately sent from the RF unit 14 to the I/Q converter 1511 through four lines of the mixers 1511a to 1511d. During an "off" period of the switches 1511e and 1511f, the digital signals are separately sent through two lines of the mixers 1511a and 1511b.

The mixers 1511a and 1511b mix the received digital signals with the I-phase and Q-phase local signals, respectively, having an intermediate-frequency IF1 output from the NCO 153a. The mixers 1511c and 1511d mix the received digital signals with the I-phase and Q-phase local signals, respectively, having an intermediate-frequency IF2 output from the NCO 153b. The mixers 1511a and 1511b, respectively, output I-phase and Q-phase baseband signals having a reception frequency corresponding to the intermediate frequency IF1. The mixers 1511c and 1511d, respectively, output I-phase and Q-phase baseband signals having a reception frequency corresponding to the intermediate frequency IF2.

The integrator 1512a integrates the respective baseband signals output from the mixers 1511a and 1511b over the length of one chip of the C/A code, namely, 1/1023 ms (approximately 1 μs), and outputs the respective integrated signals as I-phase and Q-phase data. The integrator 1512b integrates the respective baseband signals output from the mixers 1511c and 1511d over the length of one chip of the C/A code and outputs the respective integrated signals as I-phase and Q-phase data. Alternatively, the integrators 1512a and 1512b may be low-pass filters that cut AC components having a shorter cycle than the length of one chip of the C/A code.

The correlator 1513 is a matched filter, for example. The correlator 1513 holds the I-phase data and the Q-phase data output from the integrators 1512a and 1512b and the C/A codes generated by the inverse-spreading code generator 154 every one cycle of C/A code (1023 chips) to obtain the correlation between the I-phase data and the C/A code and the correlation between the Q-phase data and the C/A code. The correlator 1513 includes shift registers 1513a and 1513b, a RAM 1513c, a selector 1513d, multiplier groups 1513e and 1513f, and adders 1513g to 1513j.

The shift registers 1513a and 1513b each have 1023 stages each holding 12-bit data. The shift register 1513a receives the I-phase data from the integrators 1512a and 1512b. The shift register 1513b receives the Q-phase data from the integrators 1512a and 1512b. Each of the shift registers 1513a and 1513b can be switched between a mode of holding 1023 12-bit (first bit number) data and a mode of holding a pair of 1023 pieces of 6-bit (second bit number) data in parallel.

The shift registers 1513a and 1513b are controlled to be switched between the modes of holding data in conjunction with on/off switching of the switches 1511e and 1511f of the I/O converter 1511. During the "off" period of the switches 1511e and 1511f, the 1023 12-bit I-phase data and the 1023 12-bit Q-phase data output from the integrator 1512a are sequentially accumulated in the shift registers 1513a and 1513b, respectively. During this period, the integrator 1512b does not send data to the shift registers 1513a and 1513b. During the "on" period of the switches 1511e and 1511f, the 6-bit data based on the 12-bit I-phase data output from the respective integrators 1512a and 1512b are sent to the shift register 1513a in parallel. In addition, the 6-bit data based on the 12-bit Q-phase data output from the integrators 1512a and 1512b are input to the shift register 1513b in parallel. Each shift register accumulates the 1023 data in series in the order of input.

For example, only higher 6 bits of 12 bits are acquired to convert the 12-bit data output from the integrators 1512a and 1512b to the 6-bit data that are to be sent to the shift registers 1513a and 1513b.

The RAM 1513c receives the binary code data of 1023 chips corresponding to one cycle of C/A code from the inverse-spreading code generator 154. The RAM 1513c of the embodiment can store C/A codes for four GPS satellites at maximum, and the selector 1513d selects the C/A code of one of the GPS satellites. Each unit of code data stored in the RAM 1513c is, but not limited to, expressed by one bit for the purpose of a reduction in the size of the satellite radio receiver 1 and simplification of the processing.

The multiplier group 1513e multiplies respective pieces of chip data representing the C/A code of the GPS satellite selected by the selector 1513d from the C/A codes stored in the RAM 1513c by the respective I-phase data, which are received from the integrator 1512a and stored in the shift register 1513a, having the same phase, namely, received in the same turn, and outputs the products to the adder 1513g. In addition, the multiplier group 1513e multiplies respective pieces of chip data representing the C/A code of the GPS satellite selected by the selector 1513d from the C/A codes stored in the RAM 1513c by the respective I-phase data, which are received from the integrator 1512b and stored in the shift register 1513a, in the same phase, and outputs the products to the adder 1513h. The multiplier group 1513f multiplies respective pieces of chip data representing the C/A code of the GPS satellite selected by the selector 1513d from the C/A codes stored in the RAM 1513c by the respective Q-phase data, which are received from the integrator 1512a and stored in the shift register 1513b, in the same phase, and outputs the products to the adder 1513i. In addition, the multiplier group 1513f multiplies respective pieces of chip data representing the C/A code of the GPS satellite selected by the selector 1513d from the C/A codes stored in the RAM 1513c by the respective Q-phase data, which are received from the integrator 1512b and stored in the shift register 1513b, in the same phase, and outputs the products to the adder 1513j.

The adders 1513g and 1513i obtain the respective sums of the values from the multiplier groups 1513e and 1513f, and output the sums as correlation values of the I-phase and Q-phase data to the squaring circuit 1514a. The adders 1513h and 1513j obtain the respective sums of the values from the multiplier groups 1513e and 1513f, and output the sums as correlation values of the I-phase and Q-phase data to the squaring circuit 1514b.

The squaring circuit 1514a squares the correlation value of the I-phase data from the adder 1513g and squares the correlation value of the Q-phase data from the adder 1513i, and adds the squares together. The squaring circuit 1514b squares the correlation value of the I-phase data from the adder 1513h and squares the correlation value of the Q-phase data from the adder 1513j, and adds the squares together. These results of calculation are independently sent to the memory 157 of the baseband unit 15 and stored in the predetermined addresses described below. The adders 1513g to 1513j may output square roots of the obtained sum of squares.

Figure 3:
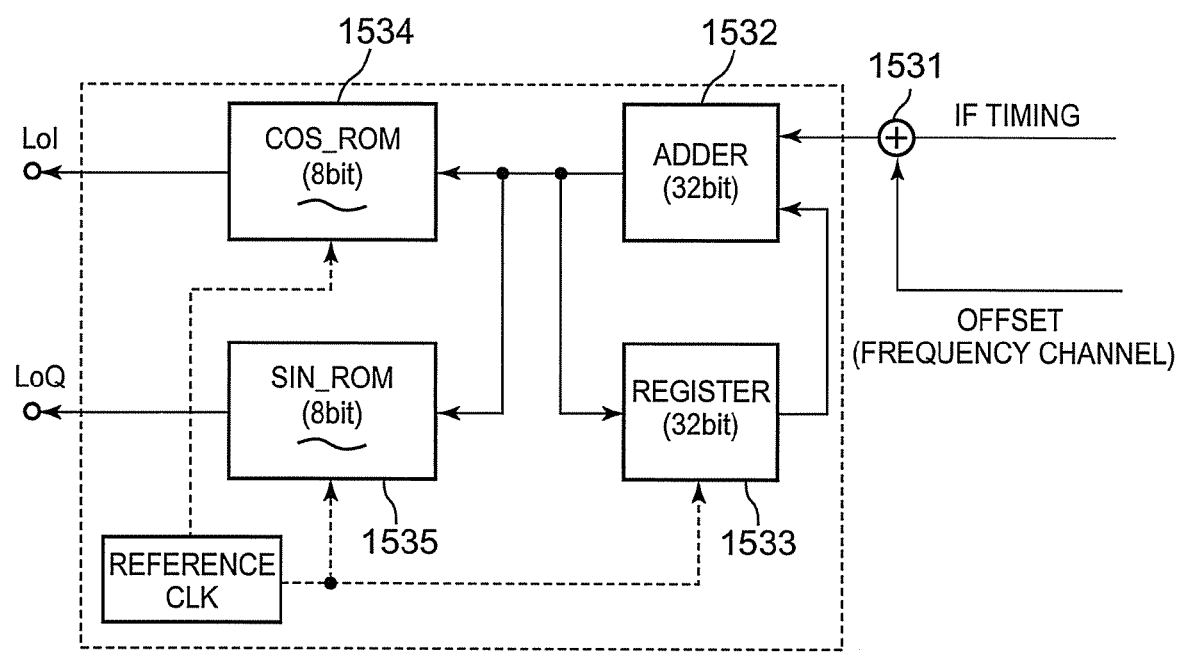
FIG. 3 is a block diagram illustrating a configuration of an NCO of an intermediate frequency generator.

FIG. 3 is a block diagram illustrating a configuration of the NCO 153a or 153b of the intermediate frequency generator 153.

Since the NCOs 153a and 153b have the same configuration, one NCO is described. The NCO of the embodiment has a circuit configuration of a direct digital synthesizer (DDS), and includes adders 1531 and 1532, a register 1533, a COS_ROM 1534, and a SIN_ROM 1535.

The adder 1531 receives a value of set IF timing and an offset value and adds the values together. The adder 1531 sends the added value to the adder 1532. The adder 1532 adds the value from the adder 1531 to a value from the register 1533, and outputs the sum to the COS_ROM 1534 and the SIN_ROM 1535 and stores the sum in the register 1533. Specifically, the adder 1532 and the register 1533 function as a phase accumulator. The value stored in the register 1533 progressively increases by the value received from the adder 1531 to the adder 1532 at a predetermined time interval. After the value stored in the register 1533 reaches the maximum value, the value is returned to zero, showing a lapse of one cycle. The adder 1532 and the register 1533 each have, but not limited to, a data capacity of 32 bits, for example.

The COS_ROM 1534 and the SIN_ROM 1535 are read only memories (ROM), in which one cycle of a cosine function with an amplitude of 1 and one cycle of a sine function with an amplitude of 1 are each equally divided into, for example, 256 phases expressed by 8 bits, and the values of the cosine function and the sine function at each phase are stored in an address corresponding to the phase. The COS_ROM 1534 and the SIN_ROM 1535 are each used as a lookup table, from which each value of the cosine function and the sine function is read out from the corresponding address in response to input of the value of a phase. In the NCO of the embodiment, if a 32-bit numerical value is sent from the adder 1532 to each of the COS_ROM 1534 and the SIN_ROM 1535, for example, each value of the COS_ROM 1534 and the SIN_ROM 1535 is read from an address corresponding to a phase represented by higher 8 bits of the numerical value. These values are successively read at a predetermined time interval, resulting in generation of I-phase and Q-phase local signals LoI and LoQ, respectively, having a specified frequency. A value may be read from each of the COS_ROM 1534 and the SIN_ROM 1535 based on a value of lower 24 bits of the input numerical value and linearly interpolated into, for example, a 12-bit value for output.

The setting value of the IF timing corresponds to the standard intermediate frequency, namely, the intermediate frequency IF0 of 4.092 MHz in the NCO of the embodiment. Hence, at an offset value (frequency channel) of the intermediate frequency of 0, the NCO outputs a local frequency signal of 4.092 MHz. The output local frequency can be digitally shifted from 4.092 MHz by varying the offset value from 0. In the NCO of the embodiment, the shift of frequency Δf corresponding to a variation of one frequency channel is 100 Hz. Specifically, the local frequency output from the NCO increases from the intermediate frequency IF0 by 100 Hz with an increase of one frequency channel, and decreases from the intermediate frequency IF0 by 100 Hz with a decrease of one frequency channel. For example, in the case of data acquisition within a range of ±15 kHz, the frequency channel varies from −150 channels to +150 channels.

A search process of the satellite radio waves by the acquisition engine 151 of the satellite radio receiver 1 of the embodiment is now described.

Figure 4:
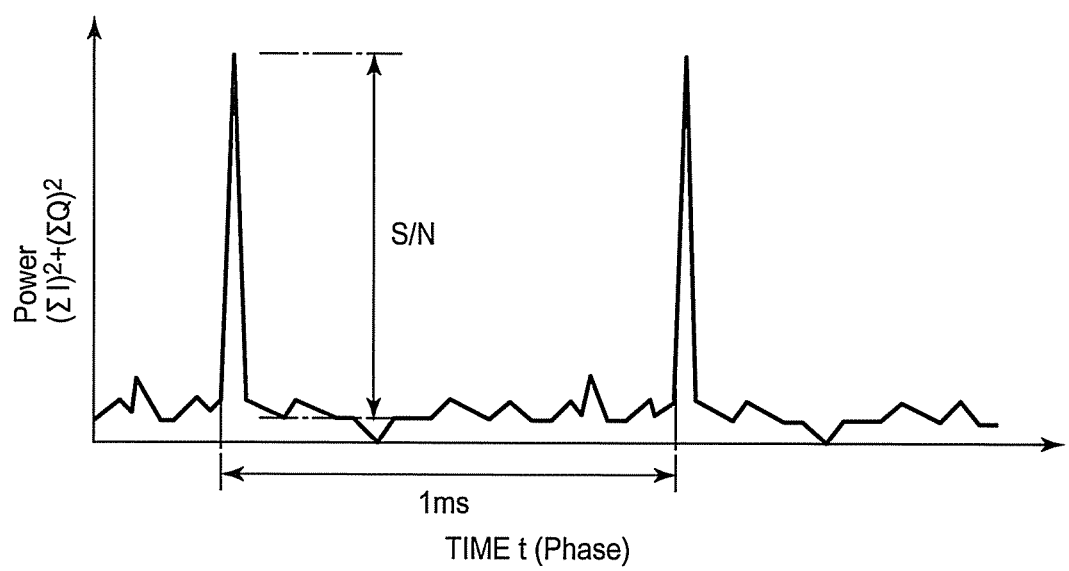
FIG. 4 illustrates exemplary output data from the acquisition engine in the case where the engine generates a C/A code of one GPS satellite and receives radio waves from the GPS satellite having one reception frequency.

FIG. 4 illustrates an exemplary output data from the acquisition engine 151 that generates a C/A code of one GPS satellite and receives radio waves from the GPS satellite having one reception frequency.

If data is input to each of the shift registers 1513a and 1513b one by one, a phase difference between the 2046 pieces of baseband data having one intermediate frequency stored in the shift registers 1513a and 1513b and 1023 pieces of chip data representing one C/A code, which is sent from the inverse-spreading code generator 154 to the RAM 1513c and selected by the selector 1513d, is less than one chip at each cycle of the C/A codes. In the spreading code, since autocorrelation is significantly low between arrays of data having different phases, the output value is always extremely low, or is at a noise level, in the case where the phase difference is one chip or more. The output value abruptly increases only in the case where the phase difference is less than one chip. Specifically, detection of the satellite signals can be determined with a largest value in a cycle among the correlation values output from the squaring circuits 1514a and 1514b. Alternatively, detection of the satellite signals can be determined with an S/N value calculated from a ratio of the largest value to the average of values other than the largest value. As the S/N value, for example, a logarithm of such a calculated value may be used.

The correlation value must be calculated for the C/A code of each GPS satellite and for each reception frequency. The reception frequency of the radio waves from the GPS satellites varies within an affectable range of errors of a measuring instrument such as an error due to Doppler speed caused by the moving speed of the GPS satellites with respect to transmission frequency from the GPS satellites and an offset error contained in the oscillation frequency of the oscillation circuit 13. The variation in frequency Δf is typically within about ±15 kHz. Hence, in the case where the baseband signals are extracted from the received radio signals, which are converted to the intermediate-frequency signals by the down converter 141, the variation in frequency Δf from the intermediate frequency IF0 must be also varied within the same range to specify the reception frequency for the respective local-frequency signals having the intermediate frequencies IF1 and IF2 output from the NCO 153a and 153b. To specify the reception frequency with an accuracy of about 100 Hz, search must be repeated through repeated data processing by the acquisition engine 151 while the variation in frequency Δf is switched about 300 times.

Thus, the satellite radio receiver 1 of the embodiment performs search 60 times per satellite at a frequency interval (first frequency interval) of 500 Hz within a range of ±15 kHz (first frequency range) as the first search. The satellite radio receiver 1 performs search again as the second search based on the C/A code and the frequency, which provide the largest S/N value, with the variation in frequency Δf of an interval of 100 Hz (second frequency interval) within a frequency range of about ±500 Hz (second frequency range) centering on the above frequency at the above C/A code, and thus specifies the reception frequency.

A search process of the satellite radio waves with the acquisition engine 151 is now described with reference to flowcharts.

Figure 5:
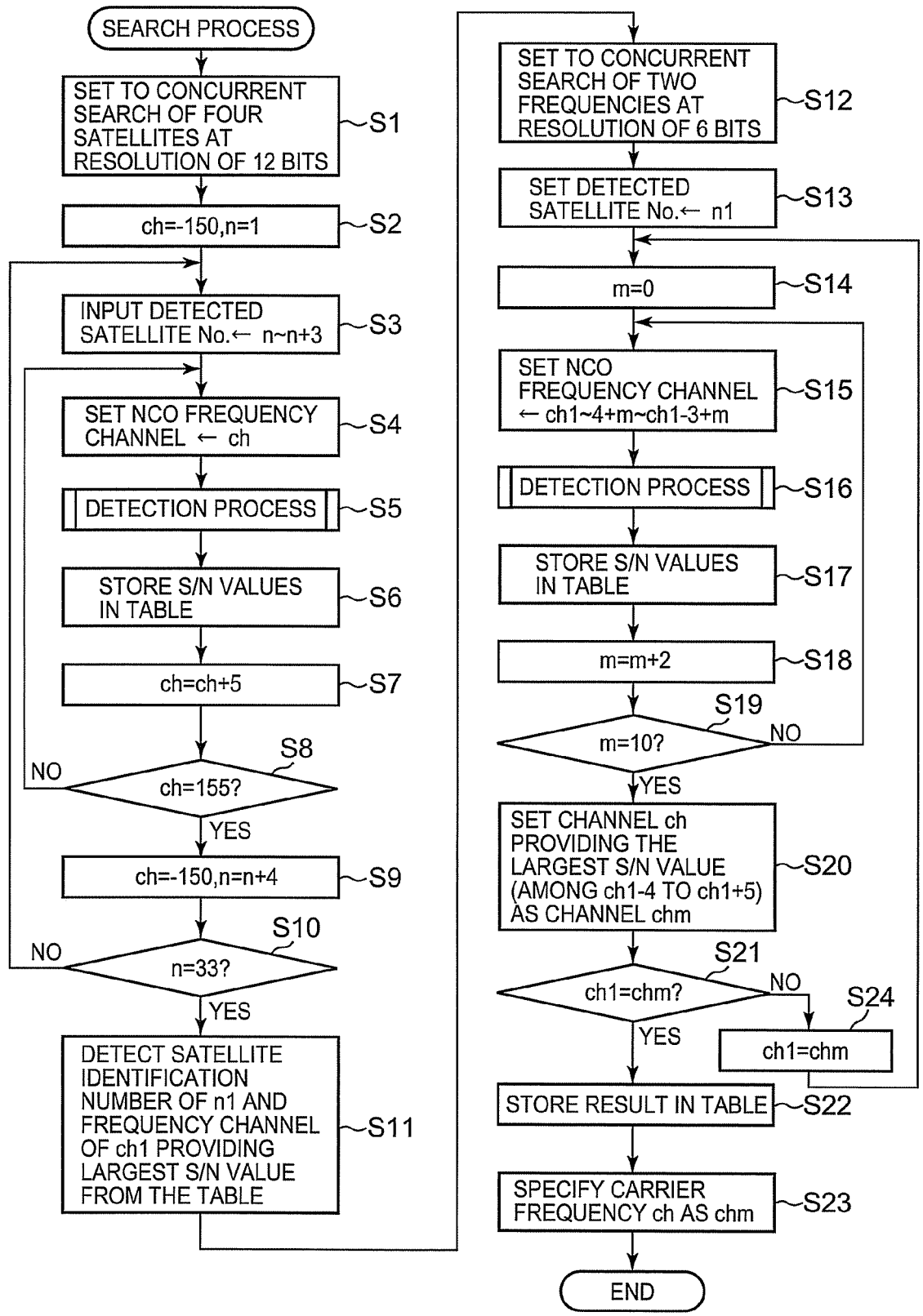
FIG. 5 is a flowchart illustrating a control process executed by a CPU of a controller in a search process.
Figure 6:
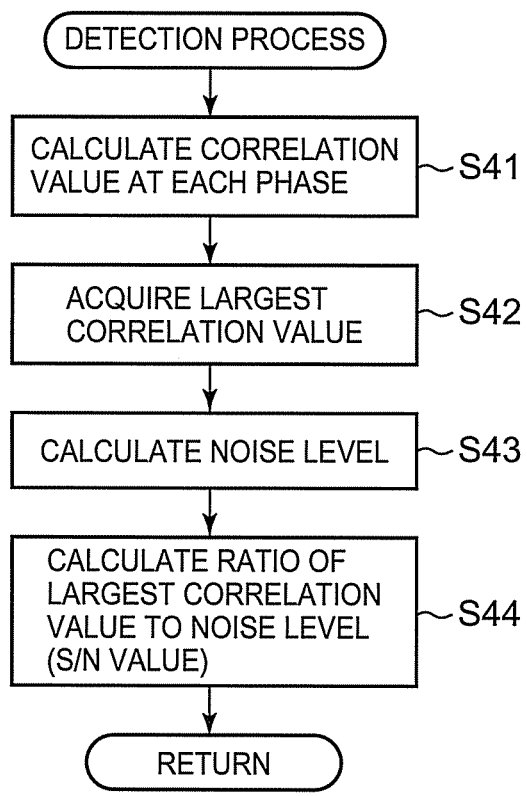
FIG. 6 is a flowchart illustrating a control process of detection.
Figures 7A, 7B:
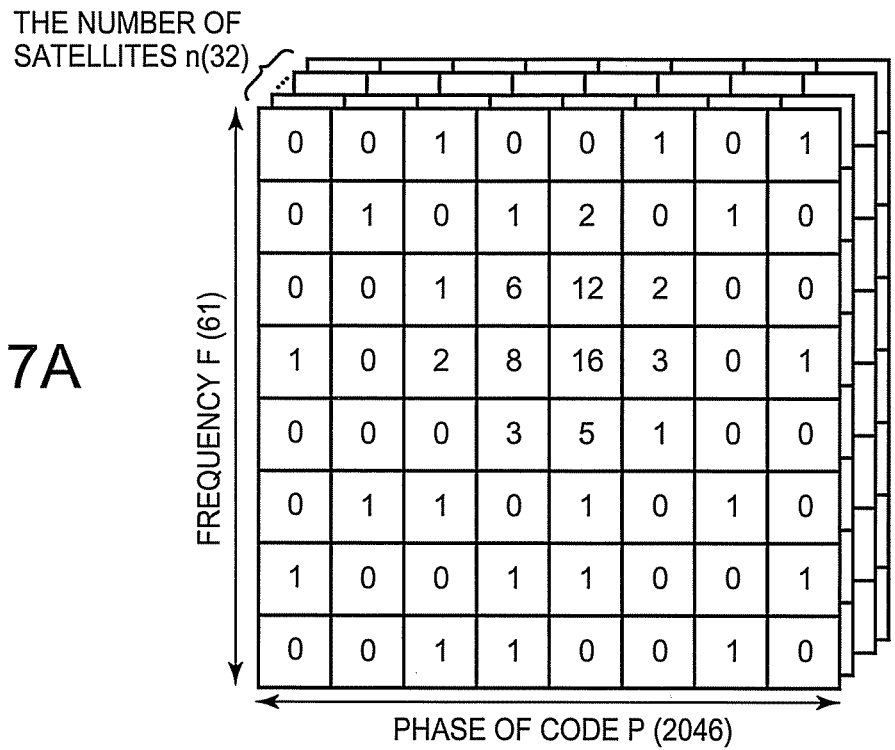
FIGS. 7A and 7B illustrate array patterns of data stored in the memory in the search process.

FIG. 5 is a flowchart illustrating a control process executed by the CPU of the controller 156 in a search process of the radio waves from all the GPS satellites over all the set frequencies. FIG. 6 is a flowchart illustrating a control process of a detection process called in FIG. 5. FIGS. 7A and 7B illustrate array patterns of data stored in the memory 157 in the search process.

Upon start of the search process, the CPU of the controller 156 sets the processing conditions by the acquisition engine 151 to concurrent search of four satellites at a resolution of 12 bits (step S1). Specifically, the CPU turns off the switches 1511e and 1511f, the integrator 1512b, and the NCO 153b. In addition, the CPU instructs the integrator 1512a to output 12-bit data to each of the shift registers 1513a and 1513b.

The CPU then sets the frequency channel ch to "−150" and the satellite identification number n to "1", as initial values (step S2).

The CPU sends satellite identification numbers n to n+3 in order to the inverse-spreading code generator 154 as detected satellite numbers, and generates the C/A codes of the GPS satellites corresponding to the satellite identification numbers n to n+3, and stores the C/A codes to the RAM 1513c (step S3). The CPU then sets the set frequency channel ch as an offset value to be input to the NCO 153a (step S4).

After the variables are set in steps S1 to S4, the CPU of the controller 156 calls a detection process to perform first detection of signals transmitted from the GPS satellites (step S5). In the first detection, the CPU supplies an operation clock to the overall acquisition engine 151, and stores the 12-bit I-phase data calculated with the mixer 1511a and the integrator 1512a to the shift register 1513a in order, as shown in FIG. 6. In addition, the CPU stores the 12-bit Q-phase data calculated with the mixer 1511b and the integrator 1512a to the shift register 1513b in order. After the 12-bit data are stored in all the shift registers 1513a and 1513b, the CPU operates the selector 1513d to output the C/A codes of the GPS satellites corresponding to the satellite identification numbers n to n+3 to the multiplier groups 1513e and 1513f in order before the subsequent I-phase data and Q-phase data are input to the shift registers 1513a and 1513b, respectively. Data processing is then performed with the C/A code data, the I-phase data in the shift register 1513a, and the Q-phase data in the shift register 1513b. After the squaring circuits 1514a and 1514b calculate the correlation values, the CPU stores the correlation values in order in the memory 157 as values at a frequency channel ch of −150 and a phase P of 0.

The CPU of the controller 156 then operates the selector 1513d to output the C/A codes of the GPS satellites corresponding to the satellite identification numbers n to n+3 to the multiplier groups 1513e and 1513f in order whenever the respective I-phase data and Q-phase data are input to the shift registers 1513a and 1513b and thus the phase P is changed. The data processing is then performed and the squaring circuits 1514a and 1514b calculate the correlation values, and the CPU then stores the respective correlation values output from the squaring circuits 1514a and 1514b in order in the addresses of the relevant phases P in the memory 157. As shown in FIG. 7A, the obtained correlation values are arranged on a three-dimensional array based on the three variables of the phase P of the C/A code, the reception frequency F (namely, received channel ch), and the satellite identification number n. The acquisition engine 151 sets the three variables to obtain the correlation values which are then output and stored in the addresses determined by the three variables.

After the correlation values in all the 2046 phases are stored in the memory 157 (step S41), the CPU acquires the largest correlation value at the same frequency channel ch (step S42). The CPU then obtains the average of the correlation values other than the largest value at the frequency channel ch to calculate a noise level (step S43). The CPU then calculates the ratio of the largest correlation value acquired in the process of step S42 to the correlation value of the noise level calculated in the process of step S43, as the S/N value (step S44). The CPU then returns the process to the search process.

After the CPU returns the process to the search process, the CPU stores the S/N value obtained in the detection process and the satellite identification number n providing the largest S/N value in the memory 157 (step S6). As shown in FIG. 7B, the table stores the frequency channels ch, the satellite identification numbers n, and the S/N values involved in the detection process.

The CPU then adds "5" to the frequency channel ch (step S7). The CPU then determines whether a new frequency channel ch is "155" or not (step S8). If the CPU determines the frequency channel ch to be not "155", the CPU selects "NO", and returns the process to step S4, and calculates a correlation value at the updated frequency channel ch (steps S4 to S7). Specifically, in the first detection, the correlation values are calculated at a frequency interval of 500 Hz within a range of ±15 kHz with respect to the intermediate frequency IF0.

If the CPU determines the frequency channel ch to be "155" in the determination of step S8, the CPU selects "YES". The CPU then initializes the frequency channel ch so as to return the frequency channel to "−150", and adds "4" to the satellite identification number n (step S9).

The CPU then determines whether the satellite identification number n, which is updated in step S9, is "33" or not (step S10). If the CPU determines the satellite identification number n to be not "33", the CPU returns the process to step S3, and repeatedly acquires the correlation values for the GPS satellites corresponding to the updated satellite identification numbers n to n+3 as detected satellites numbers (steps S3 to S7).

If the CPU determines the satellite identification number n to be "33" in the determination of step S10, the CPU shifts the process to step S11. The CPU searches for the largest value from the S/N values stored in the table of the memory 157 as shown in FIG. 7B, and sets the satellite identification number n providing the largest value as a primarily-detected satellite identification number n1, and sets the value of the relevant frequency channel ch as a primarily-detected channel ch1.

After the first search is finished with the process of step S11, the CPU of the controller 156 starts second search. The CPU of the controller 156 sets the data processing by the acquisition engine 151 to concurrent search of two frequencies at a resolution of 6 bits (step S12). Specifically, the CPU turns on the switches 1511e and 1511f, the integrator 1512b, and the NCO 153b. In addition, the CPU instructs the integrators 1512a and 1512b to output 6-bit data in parallel to the shift registers 1513a and 1513b, respectively.

The CPU then sets the primarily-detected satellite identification number n1 as a detected satellite number (step S13). The CPU then sets the variable m to "0" (step S14). In addition, the CPU sets the frequency channels ch to "ch1−4+m" and "ch1−3+m", and sets the respective set frequency channels ch as offset values to be input to the NCOs 153a and 153b (step S15).

After these are set in the processes of steps S12 to S15, the CPU performs second detection (step S16). In the second detection, as shown in FIG. 6, the CPU instructs the acquisition engine 151 to calculate correlation values in parallel with respect to the two frequency channels ch of ch1−4+m and ch1−3+m at each phase P with the C/A code of the GPS satellite corresponding to the primarily-detected satellite identification number n1. The CPU then stores the obtained correlation values in the memory 157 (step S41). The correlation values are stored in the two-dimensional array that is set with the two variables of the frequency channel ch and the phase P on the memory 157. The real addresses on the memory 157 for actually storing the obtained correlation values are set in the memory 157a or 157b in correspondence to the squaring circuit 1514a or 1514b that outputs the correlation values. In this way, the memory 157 enables parallel writing even if the operation timing of the squaring circuit 1514a overlaps with that of the squaring circuit 1514b.

After the correlation values are obtained for all the phases P at the set, two frequency channels and stored in the memory 157, the CPU acquires the largest correlation value for each frequency channel ch (step S42), and calculates the noise level for each channel ch (step S43), and calculates the S/N value at each frequency channel ch (step S44). The processes of steps S42 to S44 are the same as those in the first detection executed in step S5, and the detailed description of them is omitted. The CPU then returns the process to the search process.

After the CPU returns the process to the search process, the CPU stores the two obtained S/N values in the table (step S17).

The CPU adds "2" to the variable m (step S18). The CPU then determines whether the variable m to be "10" or not (step S19). If the CPU determines the variable m to be not "10", the CPU returns the process to step S15, and instructs the acquisition engine 151 to perform detection at the updated received channel ch (steps S15 to S18). Specifically, in the second detection process, the correlation values are calculated at a frequency interval of 100 Hz within a range of −400 to +500

Hz with respect to the reception frequency corresponding to the primarily-detected frequency channel ch1.

If the CPU determines the variable m to be "10" in the determination of step S19, the CPU sets the value of the frequency channel ch providing the largest S/N value among the S/N values, which are calculated at the frequency channels ch=ch1−4 to ch1+5 and stored in the table of the memory 157, as the secondarily-detected channel chm (step S20). The CPU then determines whether the primarily-detected channel ch1 is equal to the secondarily-detected channel chm or not (step S21). If the CPU determines the primarily-detected channel ch1 to be not equal to the secondarily-detected channel chm, the CPU sets the value of the secondarily-detected channel chm as that of the primarily-detected channel ch1 (step S24). The CPU then returns the process to step S14, and repeats the processes for the second search based on the updated primarily-detected channel ch1 (steps S14 to S20).

The determination of step S21, the process of the step S24, and the second search may be omitted.

If the CPU determines the primarily-detected channel ch1 to be equal to the secondarily-detected channel chm in the determination of step S21, the CPU stores the above search result in the table of the memory 157 (step S22), and specifies the secondarily-detected channel chm as a carrier frequency (step S23), and finishes the search process.

As described above, the satellite radio receiver 1 of the embodiment of the invention has the acquisition engine 151 that detects the satellite signals from the GPS satellites from the received radio waves in the L1 zone, and the acquisition engine 151 acquires the received signals having the reception frequencies, which are set in order at the frequency interval of 500 Hz over the frequency range of ±15 kHz by the controller 156, as 12-bit digital data. The acquisition engine 151 then performs data processing from the digital data to detect the satellite signals from the GPS satellites. If the satellite signals are detected, the controller 156 then concurrently sets two reception frequencies in order at an interval of 100 Hz, and the acquisition engine 151 acquires the two received signals having the different reception frequencies as 6-bit digital data. The acquisition engine 151 then performs data processing to concurrently detect the satellite signals from the digital data concerning the two reception frequencies. The controller 156 then specifies the reception frequencies of the satellite signals based on the result of the data processing. These steps contribute to a reduction in search time of the reception frequencies in acquisition of the satellite signals. Such a reduction in search time leads to a reduction in receiving time, resulting in a reduction in power consumption. In addition, the dynamic range of the digital data acquired in the second search is reduced based on the results of the first search. This leads to a reduction in the number of bits required for storing the data, resulting in suppression of an increase in memory capacity for concurrent storage of a plurality of reception frequency data groups. This avoids an increase in size of the satellite radio receiver 1 accompanied by high-speed search operation.

In particular, 12-bit digital data is acquired in the first search and 6-bit digital data is acquired for the two frequencies in the second search, so that the shift registers 1513a and 1513b have the same required memory capacity. In addition, the reception frequency of the satellite signals can be specified in a short time without a change in size of each of the shift registers 1513a and 1513b.

The acquisition engine 151 searches for the satellite signals through obtaining the correlation values between the baseband signals having the reception frequencies set based on the input values to the NCOs 153a and 153b of the intermediate frequency generator 153 and C/A codes for spread spectrum modulation of satellite signals in positioning satellites. This can speed up search of the satellite signals while the frequency is stably and easily controlled.

The correlation values between the baseband signals and the C/A codes are obtained with the matched filter (correlator 1513) that can receive the 12-bit digital data. The matched filter can concurrently receive a pair of 6-bit digital data having the different reception frequencies during the second search to obtain the respective correlation values with the C/A codes. Accordingly, the correlation values can be calculated at high speed at all phases, and the correlation values for the pair of input data having the different frequencies can be concurrently calculated without a change in size of the matched filter.

The intermediate frequency generator 153 includes the two independent NCOs 153a and 153b to acquire the baseband signals from the received radio signals, which are converted to the intermediate-frequency signals by the down converter 141. The respective NCOs 153a and 153b output signals having different frequencies to be mixed with the intermediate-frequency received radio signals. This facilitates the baseband signals having the two reception frequencies to be concurrently sent to the matched filter. In addition, since the NCOs 153a and 153b each have a significantly smaller size than the shift registers 1513a and 1513b of the matched filter, such parallel arrangement of the NCOs hardly affects size of the satellite radio receiver.

In the second search, the higher 6 bits are selected from the converted 12-bit digital data and sent to the shift registers 1513a and 1513b, as in the first search. This allows easy conversion of the input bit number without any modification of configurations of the ADC 143, the I/Q converter 1511, and the integrator circuits 1512a and 1512b.

In addition, the second search is performed only within a frequency range of about ±500 Hz with respect to the frequency at which the satellite signals are detected in the first search, leading to a further reduction in second search time.

In addition, since the correlation values, which are concurrently calculated by the acquisition engine 151 and output from the squaring circuits 1514a and 1514b in the second search, are independently stored in the memories 157a and 157b, the values are written to the memories without a delay even if output timing of the value from the squaring circuit 1514a overlaps with that from the squaring circuit 1514b.

In the first search, the satellite signals can be concurrently detected from a plurality of GPS satellites with the RAM 1513c and the selector 1513d. In the second search, the satellite signals are detected only from the GPS satellite concerning the highest receiving intensity to specify the reception frequency. This prevents useless search of satellite signals from GPS satellites, achieving a reduction in search time.

If data is required to be received from a plurality of satellites, the second search can be performed only for the GPS satellites that transmit the satellite signals detected in the first search. This prevents useless search of satellite signals from GPS satellites, achieving a reduction in search time.

The present invention is not limited to the above-described embodiment, and includes various modifications or alterations.

The first search is performed through acquisition and processing of the 12-bit data in the correlator 1513, while the second search is performed through acquisition and processing of the pair of 6-bit data having different frequencies in the embodiment. Data, however, can be acquired by any combination other than this combination. For example, the first search may be performed through processing of 16-bit data while the second search is performed through processing of 8-bit data. The second search may be performed through processing of three sets of 4-bit data having different frequencies. Such a case requires three sets of NCOs, data processors of the acquisition engine 151, and memories 157. The bit number of digital data in the first search is not always the same as the total bit number of concurrently processed digital data in the second search. If the bit number in the first search is different from the total bit number in the second search, surplus bits are produced in the first or second search. In such a case, for example, 12-bit data is used in the first search while a pair of 8-bit data having different frequencies is used in the second search, and the shift registers 1513a and 1513b store 16-bit data. Such a configuration can suppress an increase in memory capacity compared with a configuration of dual 12-bit input lines, namely, can suppress an increase in size of the shift registers.

The higher 6 bits are acquired from the 12-bit data in the second search of the embodiment. Any other data acquisition is also available. For example, 6 bits, which may represent the largest correlation value acquired in the first search, may be acquired.

Although the bit data is divided in the predetermined number of bits and of frequencies in the second search of the embodiment, the bit data may be variably divided depending on the dynamic range obtained in the first search.

In the second search of the embodiment, the reception frequency is specified only for the positioning satellite concerning the highest receiving intensity. If satellite signals must be acquired from a plurality of satellites, for example, for calculating a current position, reception frequencies may be specified for a plurality of detected satellites.

In addition, the specific configurations or the numerical values of the setting intervals and ranges of the reception frequencies shown in the above-described embodiment may be appropriately modified or altered within the scope without departing from the spirit of the present invention.

The entire disclosure of Japanese Patent Application No. 2011-041165 filed on Feb. 28, 2011 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A satellite radio receiver for acquiring satellite signals transmitted from positioning satellites via radio waves, the satellite radio receiver comprising:
    a receiver for receiving the radio waves in a frequency band containing transmission frequencies of the satellite signals;
    a detection processor for concurrently performing predetermined processes for detecting the satellite signals from received radio signals in the radio waves received by the receiver to a predetermined number of two or more reception frequencies;
    an acquisition unit for
        (i) setting one reception frequency in turn at a first frequency interval over a first frequency range,
        (ii) allowing the detection processor to acquire a signal having the reception frequency as digital data having a first bit number, and
        (iii) detecting the satellite signals based on a result of the predetermined processes with the digital data; and
    a specifying unit for, in response to detection of the satellite signals by the acquisition unit,
        (i) concurrently setting the predetermined number of reception frequencies in turn at a second frequency interval narrower than the first frequency interval,
        (ii) allowing the detection processor to acquire the respective signals having the reception frequencies as digital data having a second bit number smaller than the first bit number, and
        (iii) specifying reception frequencies of the satellite signals based on the result of the predetermined processes that are concurrently executed with the predetermined number of digital data.

2. The satellite radio receiver according to claim 1, wherein the second bit number is equal to a quotient of the first bit number divided by the predetermined number.

3. The satellite radio receiver according to claim 2, wherein the detection processor
    (i) acquires baseband signals having set reception frequencies, and
    (ii) obtains correlations between the baseband signals and spreading codes for spread spectrum modulation of the satellite signals in the positioning satellites.

4. The satellite radio receiver according to claim 3, wherein the detection processor includes a matched filter for obtaining the correlations between the baseband signals and the spreading codes, and
    the matched filter
    (i) receives the predetermined number of digital data having the second bit number in parallel, and
    (ii) obtains the respective correlations with the spreading codes.

5. The satellite radio receiver according to claim 4, further comprising:
    a local frequency oscillator for outputting the set predetermined number of different frequency signals,
    wherein the detection processor mixes the received radio signals to each of the frequency signals output from the local frequency oscillator to concurrently acquire the baseband signals having different reception frequencies, respectively.

6. The satellite radio receiver according to claim 3, further comprising:
    a local frequency oscillator for outputting the set predetermined number of different frequency signals,
    wherein the detection processor mixes the received radio signals to each of the frequency signals output from the local frequency oscillator to concurrently acquire the baseband signals having different reception frequencies, respectively.

7. The satellite radio receiver according to claim 2, wherein the digital data having the second bit number correspond to higher bits corresponding to the second bit number of the digital data having the first bit number.

8. The satellite radio receiver according to claim 2, wherein in the case where the acquisition unit detects the satellite signals, the specifying unit concurrently sets the predetermined number of reception frequencies in turn over a second frequency range, which contains a detected frequency at which the satellite signals are detected and is narrower than the first frequency range.

9. The satellite radio receiver according to claim 2, further comprising a processing result storage unit,
    wherein in the case where the detection processor concurrently obtains correlations between the baseband signals having set reception frequencies, respectively, and spreading codes for spread spectrum modulation of the satellite signals in the positioning satellites regarding the predetermined number of reception frequencies, the processing result storage unit separately stores the concurrently obtained correlation values.

10. The satellite radio receiver according to claim 2, wherein the acquisition unit concurrently detects the satellite signals from a plurality of positioning satellites, and in the case where the acquisition unit detects the satellite signals from the plurality of positioning satellites, the specifying unit specifies reception frequencies of the satellite signals from a positioning satellite concerning the highest receiving intensity among the detected satellite signals.

11. The satellite radio receiver according to claim 2, wherein the acquisition unit concurrently detects the satellite signals from a plurality of positioning satellites, and in the case where the acquisition unit detects the satellite signals from the plurality of positioning satellites, the specifying unit specifies respective reception frequencies of the satellite signals from the detected positioning satellites.

12. The satellite radio receiver according to claim 1, wherein the detection processor
   (i) acquires baseband signals having set reception frequencies, and
   (ii) obtains correlations between the baseband signals and spreading codes for spread spectrum modulation of the satellite signals in the positioning satellites.

13. The satellite radio receiver according to claim 12, wherein the detection processor includes a matched filter for obtaining the correlations between the baseband signals and the spreading codes, and
   the matched filter
   (i) receives the predetermined number of the digital data having the second bit number in parallel, and
   (ii) obtains the respective correlations with the spreading codes.

14. The satellite radio receiver according to claim 13, further comprising:
   a local frequency oscillator for outputting the set predetermined number of different frequency signals,
   wherein the detection processor mixes the received radio signals to each of the frequency signals output from the local frequency oscillator to concurrently acquire the baseband signals having the different reception frequencies, respectively.

15. The satellite radio receiver according to claim 12, further comprising:
   a local frequency oscillator for outputting the set predetermined number of different frequency signals,
   wherein the detection processor mixes the received radio signals to each of the frequency signals output from the local frequency oscillator to concurrently acquire the baseband signals having the different reception frequencies, respectively.

16. The satellite radio receiver according to claim 1, wherein the digital data having the second bit number correspond to higher bits corresponding to the second bit number of the digital data having the first bit number.

17. The satellite radio receiver according to claim 1, wherein in the case where the acquisition unit detects the satellite signals, the specifying unit concurrently sets reception frequencies in turn by the predetermined number over a second frequency range, which contains a detected frequency at which the satellite signals are detected and is narrower than the first frequency range.

18. The satellite radio receiver according to claim 1, further comprising a processing result storage unit,
   wherein in the case where the detection processor concurrently obtains correlations between the baseband signals having set reception frequencies, respectively, and spreading codes for spread spectrum modulation of the satellite signals in the positioning satellites regarding the predetermined number of reception frequencies, the processing result storage unit separately stores the concurrently obtained correlation values.

19. The satellite radio receiver according to claim 1, wherein the acquisition unit concurrently detects the satellite signals from a plurality of positioning satellites, and in the case where the acquisition unit detects the satellite signals from the plurality of positioning satellites, the specifying unit specifies reception frequencies of the satellite signals from a positioning satellite concerning the highest receiving intensity among the detected satellite signals.

20. The satellite radio receiver according to claim 1, wherein the acquisition unit concurrently detects the satellite signals from a plurality of positioning satellites, and in the case where the acquisition unit detects the satellite signals from the plurality of positioning satellites, the specifying unit specifies respective reception frequencies of the satellite signals from the detected positioning satellites.

* * * * *